(12) United States Patent
Kothandapani et al.

(10) Patent No.: US 8,312,163 B1
(45) Date of Patent: Nov. 13, 2012

(54) METHODS, SYSTEMS, AND COMPUTER-READABLE MEDIA FOR ADJUSTING THE QUALITY LEVEL OF DATA TRANSMITTED BETWEEN A LOCAL COMPUTER AND A REMOTE COMPUTER

(75) Inventors: Govind Kothandapani, Snellville, GA (US); Varadachari Sudan Ayanam, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 1179 days.

(21) Appl. No.: 11/455,016

(22) Filed: Jun. 16, 2006

(51) Int. Cl.
*G06F 15/16* (2006.01)
*H04N 5/14* (2006.01)

(52) U.S. Cl. ......... 709/233; 709/232; 348/700; 348/701

(58) Field of Classification Search ................... 709/232, 709/233; 348/700, 701
See application file for complete search history.

(56) References Cited

U.S. PATENT DOCUMENTS

| | | | |
|---|---|---|---|
| 5,532,940 A * | 7/1996 | Agarwal et al. | 709/204 |
| 5,583,573 A * | 12/1996 | Asamura et al. | 375/240.04 |
| 5,651,078 A | 7/1997 | Chan | |
| 5,708,511 A | 1/1998 | Gandhi et al. | |
| 5,982,441 A | 11/1999 | Hurd et al. | |
| 6,898,313 B2 | 5/2005 | Li et al. | |
| 7,003,167 B2 | 2/2006 | Mukherjee | |
| 2004/0165783 A1* | 8/2004 | Reynolds et al. | 382/239 |
| 2004/0234142 A1* | 11/2004 | Chang et al. | 382/236 |

OTHER PUBLICATIONS

U.S. Appl. No. 11/301,202, filed Dec. 12, 2005, entitled "Method, System, and Computer-Readable Medium for the Adaptive Filtering and Compression of Video Data".
U.S. Official Action dated Dec. 12, 2008 in U.S. Appl. No. 11/301,202.
U.S. Notice of Allowance / Allowability dated Mar. 23, 2009 in U.S. Appl. No. 11/301,202.

* cited by examiner

*Primary Examiner* — Peter Shaw
(74) *Attorney, Agent, or Firm* — McKeon, Meunier, Carlin & Curfman, LLC (57) ABSTRACT

Methods, systems, and computer-readable media for transmitting data between a local computer and a remote computer are provided. An amount of data capable of being transmitted per frame from the local computer to the remote computer is determined. An amount of data associated with a current frame of data to be transmitted to the remote computer is also determined. A quality level for the data to be transmitted to the remote computer is then selected such that the amount of the data to be transmitted to the remote computer is less than or equal to the amount of data capable of being transmitted per frame to the remote computer.

3 Claims, 8 Drawing Sheets

| Quality Level | cell_x | cell_y | tlow | thigh | tscr | tstatic | nstatic | static_ix | ninter | inter_ix |
|---|---|---|---|---|---|---|---|---|---|---|
| Q1 | 32 | 32 | 4 | 8 | 10 | 4 | 3 | 0 | 60 | 0 |
| Q2 | 16 | 16 | 4 | 8 | 10 | 4 | 3 | 0 | 60 | 0 |
| Q3 | 8 | 8 | 4 | 8 | 10 | 4 | 3 | 0 | 60 | 0 |
| Q4 | 4 | 4 | 4 | 8 | 10 | 4 | 3 | 0 | 60 | 0 |
| Q5 | 2 | 2 | 4 | 8 | 10 | 4 | 3 | 0 | 60 | 0 |
| Q6 | 32 | 32 | 2 | 4 | 10 | 4 | 3 | 1 | 60 | 1 |
| Q7 | 16 | 16 | 2 | 4 | 10 | 4 | 3 | 1 | 60 | 1 |
| Q8 | 8 | 8 | 2 | 4 | 10 | 4 | 3 | 1 | 60 | 1 |
| Q9 | 4 | 4 | 2 | 4 | 10 | 4 | 3 | 1 | 60 | 2 |
| Q10 | 2 | 2 | 2 | 2 | 10 | 4 | 3 | 2 | 60 | 2 |
| Q11 | 2 | 2 | 2 | 2 | 10 | 4 | 3 | 2 | 60 | 3 |
| Q12 | 1 | 1 | 2 | 2 | 4 | 4 | 3 | 2 | 60 | 3 |
| Q13 | 1 | 1 | 2 | 2 | 4 | 2 | 3 | 2 | 60 | 3 |
| Q14 | 1 | 1 | 2 | 2 | 10 | 4 | 3 | 2 | 60 | 3 |
| Q15 | 1 | 1 | 2 | 2 | 10 | 4 | 3 | 2 | 60 | 3 |

| | cell_x | cell_y | tlow | thigh | tscr | tstatic |
|---|---|---|---|---|---|---|
| Index 0: | 3, 4 | 4 | 2 | 4 | 1 | 2 |
| Index 1: | 6, 2 | 2 | 2 | 2 | 1 | 2 |
| Index 2: | 6, 2 | 2 | 1 | 2 | 1 | 2 |
| Index 3: | 3, 1 | 1 | 1 | 1 | 2 | 1 |
| Index 4: | 0, 16 | 16 | 4 | 8 | 10 | 4 |

| | cell_x | cell_y | tlow | thigh | tscr | tstatic |
|---|---|---|---|---|---|---|
| Index 0: | 4 | 4 | 4 | 8 | 4 | 4 |
| Index 1: | 4 | 4 | 2 | 4 | 4 | 4 |
| Index 2: | 2 | 2 | 2 | 4 | 4 | 4 |
| Index 3: | 1 | 1 | 1 | 1 | 4 | 4 |

METHODS, SYSTEMS, AND COMPUTER-READABLE MEDIA FOR ADJUSTING THE QUALITY LEVEL OF DATA TRANSMITTED BETWEEN A LOCAL COMPUTER AND A REMOTE COMPUTER

TECHNICAL FIELD

The present invention is related to data transmission. More particular, the present invention relates to adjusting the quality level associated with data transmitted between a local computer and a remote computer.

BACKGROUND

Computer networks generally include a plurality of interconnected computer systems. Some computer networks utilize a local computer for communicating data to one or more remote computers that are connected to the local computer through a network. From the remote computer, users may control and view activity on a local computer over the network utilizing a hardware interface device connected to the local computer. For instance, utilizing the interface device, a user may view screens of data on the remote computer that were generated by the local computer.

Moreover, the user may provide input at the remote computer, such as through a mouse or keyboard connected to the remote computer, which causes a screen of data on the local computer to change corresponding to the input received at the remote computer. These changes are then sent to the remote computer through the network such that the user of the remote computer can view the changes generated by the local computer on the remote computer. However, as the amount of screen changes increases, the amount of time associated with sending the changes also increases, resulting in less frames of screen data being sent from the local computer to the remote computer per second. As a result, the user of the remote computer receives the changes in data corresponding to the user input more slowly which often causes user frustration and inadvertent selection of incorrect functions based on the slowed display of the changes on the remote computer. Therefore, there is a need to transmit a desired number of screen frames from a local computer to a remote computer per second even when the amount of changes in data to be transmitted increases.

SUMMARY OF THE INVENTION

In accordance with the present invention, the above and other problems are solved by providing in a computer network a methods, systems, and computer-readable media for determining a quality level for video data generated by a local computer to be transmitted to a remote computer through a network such that the amount of the video data to be transmitted does not exceed the amount of the video data capable of being transmitted.

According to one aspect of the present invention, a method is provided for transmitting data between a local computer and a remote computer. The method involves determining an amount of data capable of being transmitted per screen frame from the local computer to the remote computer. An amount of data associated with a current screen frame of data to be transmitted to the remote computer is also determined. A quality level for the data to be transmitted to the remote computer is then selected such that the amount of the data to be transmitted to the remote computer is less than or equal to the amount of data capable of being transmitted per screen frame to the remote computer.

According to another aspect of the present invention, a method is provided for transmitting data between a local computer and a remote computer by determining an amount of data capable of being transmitted per screen frame from the local computer to the remote computer. A first screen frame of data and a second screen frame of data from the local computer are captured and compared based on a first quality level to determine an amount of change in data between the second screen frame and the first screen frame. The amount of change in data between the second screen frame and the first screen frame represents an amount of data associated with the second screen frame to be transmitted at the first quality level from the local computer to the remote computer. If the amount of data associated with the second screen frame is greater than the amount of data capable of being transmitted per screen frame to the remote computer, then the second screen frame of data is discarded, and a third screen frame of data is captured. The third screen frame is compared to the first screen frame based on a second quality level which is lower than the first quality level to determine an amount of change in data between the third screen frame and the first screen frame. The amount of change in data between the third screen frame and the first screen frame represents an amount of data associated with the third screen frame of data to be transmitted at the second quality level from the local computer to the remote computer. If the amount of data associated with the third screen frame is less than or equal to the amount of data capable of being transmitted per screen frame, then the amount of data associated with the third screen frame is transmitted to the remote computer at the second quality level.

According to yet another aspect of the present invention, a computer-readable medium is provided having instructions stored thereon which, when executed by a computer, causes the computer to determine an amount of data capable of being transmitted per screen frame from a local computer to a remote computer. An amount of data associated with a current screen frame of data to be transmitted to the remote computer is also determined. A quality level for the data to be transmitted to the remote computer is then selected such that the amount of the data to be transmitted to the remote computer is less than or equal to the amount of data capable of being transmitted per screen frame to the remote computer.

DETAILED DESCRIPTION OF THE INVENTION

Embodiments of the present invention provide methods, systems, apparatus, and computer-readable media for adjusting quality level associated with data transmitted between a local computer and a remote computer. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
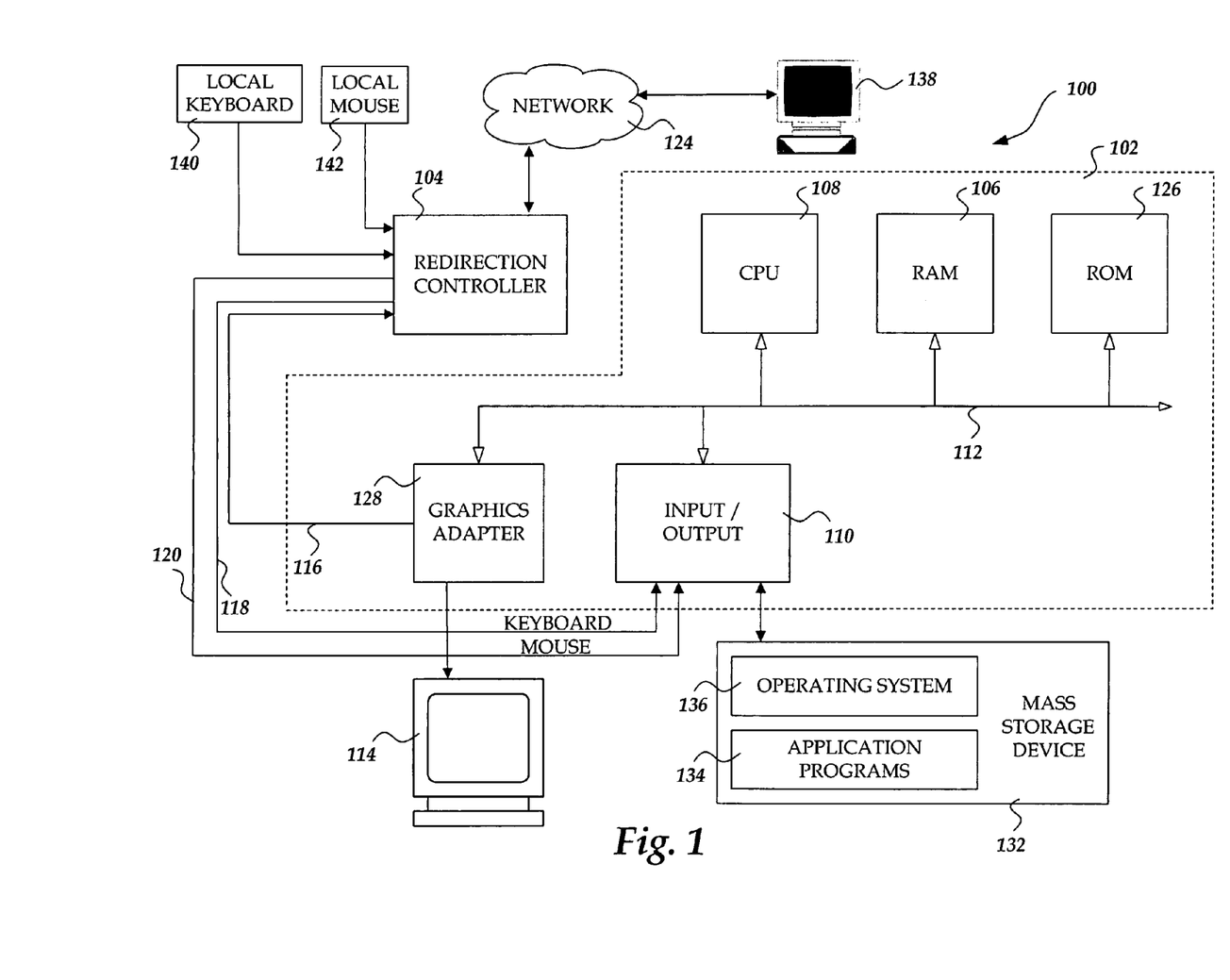
FIG. 1 is a computer architecture diagram showing aspects of a computer utilized in various embodiments of the present invention.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture 100 for practicing the various embodiments of the invention will now be described. In particular, a redirection controller 104 is provided that is operative to capture a screen frame of video data from video output generated by a local computer 102 and transmit the video data associated with the screen frame at a determined quality level through a network 124 to a remote computer 138. The network 124 may be of various forms such as a local area network ("LAN") or a wide area network ("WAN") including the Internet. The redirection controller 104 determines a quality level for the video data generated by the local computer 102 to be transmitted to the remote computer 138 such that an amount of the video data to be transmitted does not exceed an amount of the video data capable of being transmitted to the remote computer. As will be discussed in greater detail below, the redirection controller 104 utilizes at least three parameters to determine a quality level for the video data to be transmitted from the local computer 102 to the remote computer 138 including a rate at which data can be transmitted over the network 124, a preferred rate for receiving screen frames of the video data from the local computer at the remote computer, and the amount of the video data to be transmitted to the remote computer.

Once a quality level is determined, the redirection controller 104 compresses and transmits the video data over the network 124 to the remote computer 138 in accordance with the determined quality level. The remote computer 138 comprises a standard personal or server computer operative to execute a Web browser application program, such as the INTERNET EXPLORER browser from MICROSOFT CORPORATION of Redmond, Wash. The remote computer 138 also includes a plug-in for use in conjunction with the Web browser. As known to those skilled in the art, plug-ins may be created utilizing ACTIVEX technology from MICROSOFT CORPORATION, JAVA from SUN MICRO-SYSTEMS, or other similar technologies from other vendors, that allow special functions to be performed within a Web browser. In particular, the plug-in of the remote computer 138 executes in conjunction with the Web browser and communicates with the redirection device 104 to receive screen frames of video data generated by the local computer 102 from the redirection controller, decompress the received screen frames, and display the screen frames of video data at the remote computer in accordance with the quality level associated with the video data. Further, the remote computer 138 includes a network interface for linking the remote computer to the network 124. The network interface used by the remote computer 138 may be of various forms such as dial-up modem or an Ethernet connection to a LAN.

The redirection controller 104 is also operative to receive user input from the remote computer 138 in the form of keyboard or mouse input and provide the user input to the local computer 102. The plug-in of the remote computer 138 receives the input from a user of the remote computer 138 and transmits the user input to the redirection controller 104. The redirection controller 104 may then provide the user input to the local computer 102, where the input may be executed on the local computer as if the input were physically received via an input device connected directly to the local computer. In this manner, the local computer 102 may be controlled remotely by the remote computer 138.

Figure 2:
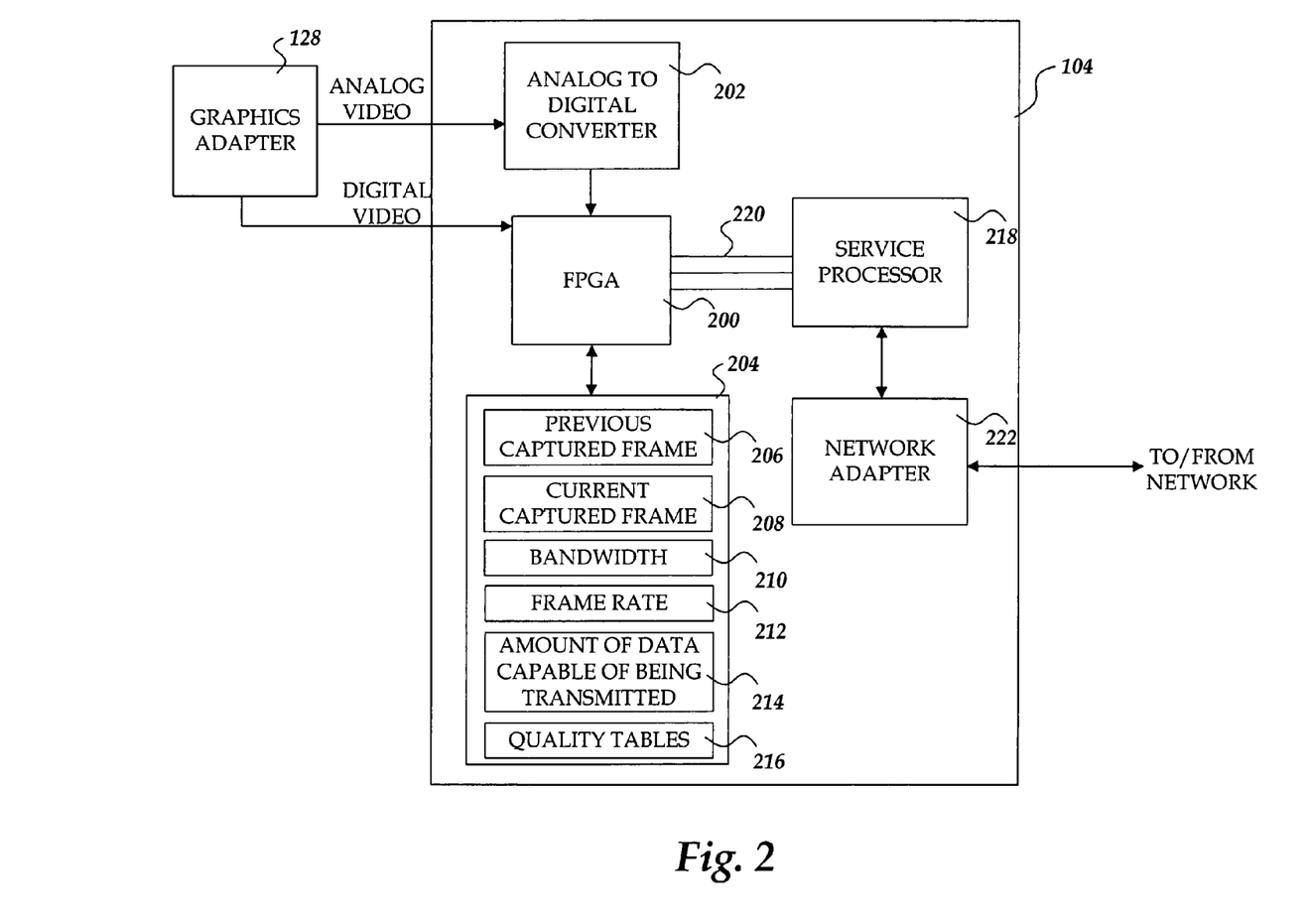
FIG. 2 shows the functional components of one embodiment of the present invention.

To accomplish the above-noted and other functions, the redirection controller 104 is communicatively connected to one or more components of the local computer 102, which, in one illustrative embodiment, include a central processing unit ("CPU") 108, a system memory, an input/output module 110, and a graphics adapter 128. In particular, the redirection controller 104 is connected to a video out port 116 of the graphics adapter 128 as well as to a keyboard input port and a mouse input port of the input/output module 110, via communications lines 118 and 120, respectively. It will be appreciated that the keyboard port and mouse port may include universal serial bus ("USB") ports and/or PS/2 ports. Ordinarily, the graphics adapter 128 provides video output which is passed directly to a monitor 114 associated with the local computer 102 where screen frames of the video output are displayed for a user present at the local computer. However, as illustrated in FIGS. 1-2 and discussed above, the video output of the graphics adapter 128 is provided to the redirection controller 104 which captures screen frames of the video output for transmission to the remote computer 138. In an embodiment of the present invention, the redirection controller 104 may also pass the video output of the graphics adapter 128 through an output associated with the redirection controller to the monitor 114 for display of screen frames of the video output. It will be appreciated that the graphics adapter 128 may process analog signals (i.e., VGA) or digital signals (i.e., DVI) for display on a compatible display unit.

As discussed above, the redirection controller 104 may also receive keyboard and mouse commands from the remote computer 138 via the network 124. A user of the remote computer 138 may enter keyboard and/or mouse commands at the remote computer to interact with the screen frame of video data generated by the local computer 102 and displayed at the remote computer. When keyboard and mouse commands are entered by a user of the remote computer 138, the commands are transmitted to the redirection controller 104 by the plug-in of the remote computer. When received, the redirection controller 104 is operative to pass the commands through communications lines 118 and 120 to the input/output module 110 so that the commands appear to the local computer 102 to have been made utilizing local keyboard and mouse devices. When implemented by the local computer 102, the commands may alter a screen frame of video data to be displayed.

In accordance with an illustrative embodiment of the present invention, data transmitted from the remote computer 138 to the redirection controller 104 may include a selected bandwidth associated with the network 124 as well as a preferred rate for receiving screen frames of the video data from the local computer 102 at the remote computer. The remote computer 138 may include default values for the bandwidth and the rate for receiving screen frames of the video data from the local computer which may be transmitted to the redirection controller 104. One or both of these values may be changed by a user of the remote computer 138, prompting the remote computer to transmit the updates to the redirection controller 104. The selected bandwidth of the network 124 and the preferred screen frame rate may be maintained at the redirection controller 104 for use by the redirection controller in determining a quality level for video data to be transmitted to the remote computer, as discussed further below.

In an embodiment of the present invention, user input devices may also be provided for the local computer 102, including a local keyboard 140 and a local mouse 142. Conventionally, the local keyboard 140 and the local mouse 142 would be directly connected to the local computer 102. However, as illustrated in FIG. 1, the local keyboard 140 and the local mouse 142 are connected to the redirection controller 104 and provide keyboard and mouse data to the redirection controller. The redirection controller 104 then passes the keyboard and mouse data to the input/output module 110 of the local computer 102.

The redirection controller 104 further includes quality level program code which may be an executable program module containing program code for determining a quality level for video data generated by the local computer 102 to be transmitted to the remote computer 138. The operations performed by the quality level program code for determining quality levels of video data to be transmitted to the remote computer 138 will be described in greater detail below with respect to FIGS. 5A-5B. The redirection controller 104 may also include compression program code for filtering and compressing video data for communication over the network 124 to the remote computer 138.

As discussed above, in an embodiment of the present invention, the local computer 102 includes a system memory which may consist of a random access memory ("RAM") 106 and a read-only memory ("ROM") 126. The ROM 126 may store a basic input/output system that includes program code containing the basic routines that help to transfer information between elements within the local computer 102. The CPU 108 of the local computer 102 is a standard central processor that performs arithmetic and logical operations necessary for the operation of the remote computer 102. CPUs are well-known in the art, and therefore not described in further detail herein. The input/output module 110 of the local computer 102 is used as a communication medium between any number and type of peripheral devices and the system bus 112. Communications destined for the CPU 108, the redirection controller 104, or any other component coupled to the system bus 112 and issued by a peripheral device must therefore pass through the input/output module 110 to the system bus 112 and then to the necessary component.

As shown in FIG. 1, the input/output module 110 is connected to a mass storage device 132 for storing an operating system 136 and application programs 134. The operating system 136 comprises a set of programs that control operations of the local computer 102 and allocation of resources. The set of programs, inclusive of certain utility programs, also provide a graphical user interface to the user. An application program is software that runs on top of the operating system software and uses computer resources made available through the operating system to perform application specific tasks desired by the user.

The mass storage device 132 and its associated computer-readable media, provide non-volatile storage for the local computer 102. Although the description of computer-readable media contained herein refers to a mass storage device, such as a hard disk or CD-ROM drive, it should be appreciated by those skilled in the art that computer-readable media can be any available media that can be accessed by the local computer 102. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 2, an illustrative architecture of the redirection controller 104 will now be described. As briefly discussed above with respect to FIG. 1, the redirection controller 104 is communicatively connected to the graphics adapter 128 for receiving, filtering, determining a quality level for, and compressing video data which is then communicated to the remote computer 138 through the network 124. As shown in FIG. 2, the redirection controller 104 may be connected to the graphics adapter 128 through a digital video or analog video connection. Where an analog video connection is utilized, the redirection controller 104 may utilize an analog to digital converter 202 to convert the received analog display screens into a digital format.

In accordance with an illustrative embodiment of the invention, the components of the redirection controller 104 may be incorporated as an external hardware device. It should be appreciated that the components of the redirection controller 104 may be incorporated into a firmware card, such as a peripheral component interconnect ("PCI") card, which is "plugged-in" to the motherboard of the local computer 102. Those skilled in the art will further appreciate that other types of redirection controllers may be utilized.

The components of the redirection controller 104 may include a field-programmable gate array ("FPGA") 200, a storage device 204, a service processor 218, and a network adapter 222. The FPGA 200 communicates with the service processor 218 over a parallel bus 220. The service processor 218 is a microcontroller that instructs the FPGA 200 to capture screen frames of video data from the graphics adapter 128 of the local computer 102, filter the video data to determine an amount of the video data associated with a current captured screen frame to transmit to the remote computer 138, and determine a quality level to transmit the determined amount of the video data to the remote computer in accordance with program instructions contained in the quality level program code. The service processor 218 may also instruct the FPGA 200 to compress the amount of the video data associated with the current captured screen frame to be transmitted to the remote computer 138 in accordance with program instructions contained in the compression program code. Once the video data associated with a current captured screen frame of video data to be transmitted to the remote computer 138 is determined, associated with a quality level, and compressed, the FPGA 200 generates and sends an interrupt signal to the service processor 218. The service processor 218 then transmits the compressed video data at the determined quality level to the remote computer 138 via the network adapter 222. It will be appreciated by those skilled in the art that the FPGA 200 and the service processor 218 may be application specific integrated circuits ("ASICs") designed for performing the aforementioned tasks.

The FPGA 200 determines an amount of video data associated with a current captured screen frame to be transmitted to the remote computer 138 by determining an amount of change in video data between a current captured screen frame of the video data and a previous captured screen frame of the video data. The determined video data changes between the current captured screen frame and the previous captured screen frame constitute an amount of video data to be transmitted to the remote computer 138. In an embodiment of the present invention, the amount of video data associated with a current captured screen frame to be transmitted to the remote computer 138 may be determined by the FPGA 200 in accordance with an exclusive disjunction ("XOR") filtering process described in U.S. patent application Ser. No. 10/247,876, entitled "System and Methods for Establishing Interaction Between a Local Computer and a Remote Computer," which is assigned to the assignee of the instant patent application and expressly incorporated herein by reference. In particular, the FPGA 200 maintains video data associated with a previous captured screen frame in a first memory location 206 of the storage device 204 and video data associated with a current captured screen frame in a second memory location 208 of the storage device. In accordance with the XOR filtering process, the FPGA 200 compares pixel values of the current captured screen frame of video data with pixel values at the same locations of the previous captured screen frame of video data to determine changes in video data that have occurred between the successive screen frames of video data. Once processing for the current captured screen frame is completed, the current captured screen frame becomes the previous captured screen frame and the next successive captured screen frame of video data becomes the current captured screen frame. The video data making up the difference detected by the XOR filtering process between the previous captured screen frame of video data and the current captured screen frame of video data is the video data to be transmitted to the remote computer 138.

In another embodiment of the present invention, the amount of video data associated with a current captured screen frame to be transmitted to the remote computer 138 may be determined by the FPGA 200 in accordance with a threshold filtering process described in U.S. patent application Ser. No. 11/301,202, entitled "Method, System, and Computer-Readable Medium for the Adaptive Filtering and Compression of Video Data" which is assigned to the assignee of the instant patent application and expressly incorporated herein by reference. In accordance with the threshold filtering process, the FPGA 200 maintains video data associated with a previous captured screen frame in the first memory location 206 of the storage device 204 and video data associated with a current captured screen frame in the second memory location 208 of the storage device. Pixel values of the current captured screen frame of video data are compared to pixel values at the same locations of the previous captured screen frame of video data to generate a filtered value for a pixel of the current captured screen frame. If the pixel values of the successive screen frames of video data are not equal, then the FPGA 200 performs threshold checks to determine the filtered valued for the pixel of the current captured screen frame. Once the filtered value for the pixel of the current captured screen frame is determined, the FPGA 200 generates an encoded value for the filtered value by applying a first algorithm when lossless compression is desired or by applying a second algorithm when lossy compression is desired. The encoded values for the video data of the current captured screen frame illustrate the video data to be transmitted to the remote computer 138. It should be appreciated by those skilled in the art that any other filtering process may be utilized to determine an amount of video data to be transmitted from the local computer 102 to the remote computer 138.

Figure 3A:
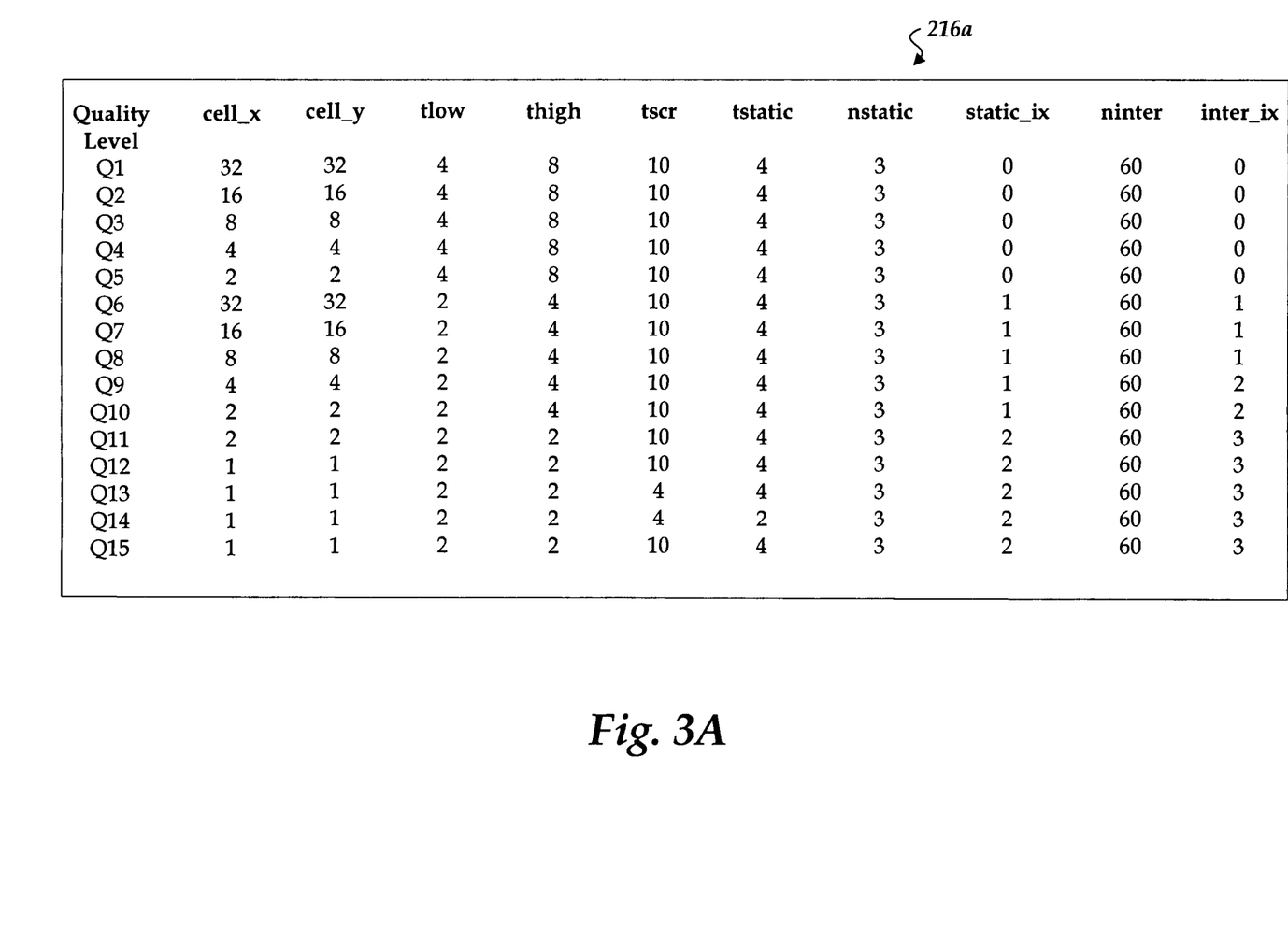
FIGS. 3A-3C depict quality tables utilized in various embodiment of the invention.
Figure 3B:
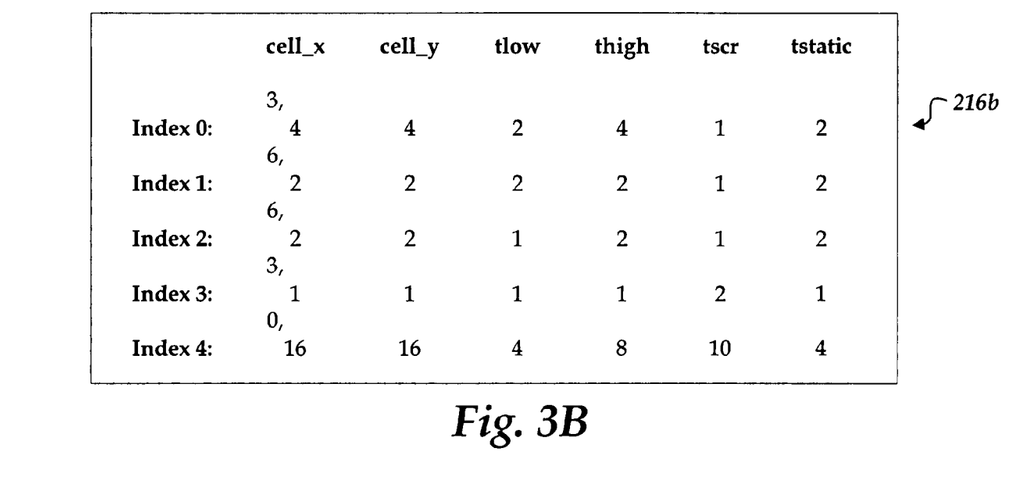
Figure 3C:
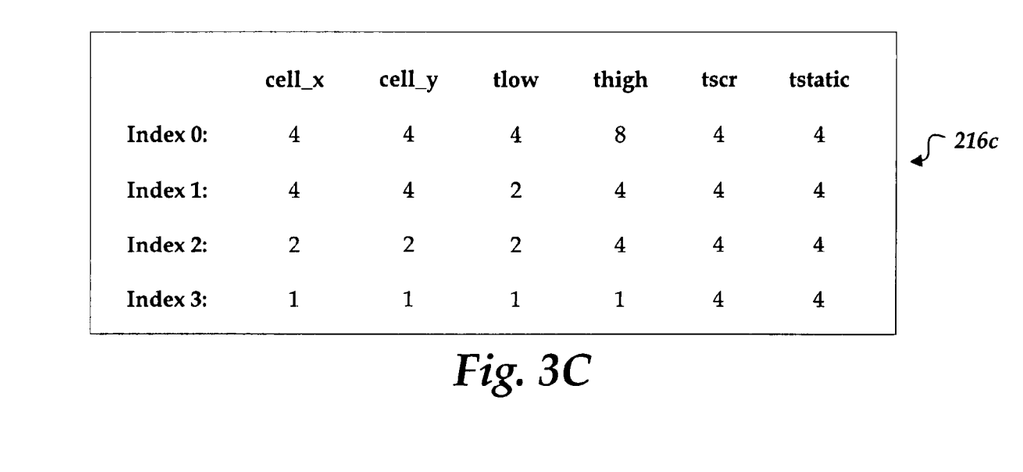

In an embodiment of the present invention, an amount of video data associated with a current captured screen frame of video data is further determined based on a quality level associated with the video data to be transmitted. In particular, the quality level associated with the video data to be transmitted dictates how many pixels of a current captured screen frame of video data are simultaneously compared with the same number of pixels at the same location of a previous captured screen frame of video data. For instance, when low quality is used to filter video data, blocks of pixels of a current captured screen frame are compared with blocks of pixels at the same locations of a previous captured screen frame to determine the amount of the video data associated with the current captured screen frame to be transmitted to the remote computer. As the quality level of video data increases, the size of the blocks of pixels compared between successive screen frames becomes smaller until a single pixel of a current captured screen frame of video data is compared with a single pixel at the same location of the previous captured screen frame of video data to determine an amount of video data to be transmitted to the remote computer 138. The FPGA 200 may determine the size of blocks of pixels of a current captured screen frame to be compared to same size blocks of pixels of a previous captured screen frame based on a cell_x value and a cell_y value corresponding to a quality level initially associated with the video data to be transmitted to the remote computer 138. The cell_x and cell_y values for each quality level at which video data may be transmitted to the remote computer 138 are maintained in quality tables 216 stored in the storage device 204, as illustrated in FIGS. 3A-3C.

The quality tables 216, which include a dynamic quality table 216a, a static quality table 216b, and an intermediate quality table 216c, are also used by the FPGA 200 when filtering the video data to determine when video data changes have actually occurred between a current captured screen frame of video data and a previous captured screen frame of video data and when to use entries associated with quality levels of the dynamic quality table, the static quality table 216b, and the intermediate quality table 216c. In particular, the quality tables 216 include a tlow value and a thigh value which are threshold values used by the FPGA 200 to determine whether a video data change has actually occurred between a current captured screen frame of video data and a previous captured screen frame of video data. The quality tables 216 also include a tscr value which is also used by the FPGA 200 to determine whether a video data change has occurred between successive captured screen frames of video data. In particular, if a current captured screen frame of video data includes at least one pixel having a value greater than the tscr value associated with the current quality level, then the FPGA 200 determines that the current captured screen frame of video data does include a change in video data from the previous captured screen frame of video data.

Further, the quality tables 216 include a tstatic value which may be used by the FPGA 200 to determine if the value of each pixel associated with a current captured screen frame of video should be changed to the value of each corresponding pixel associated with a previous captured screen frame of video data prior to filtering the current captured screen frame of video data in accordance with a current quality level. For example, if the difference between the value of a pixel of the current captured screen frame and the value of a corresponding pixel of the previous captured screen frame is less than the tstatic value, then the value of the pixel of the current captured screen frame is changed to the value of the corresponding pixel of the previous captured screen frame.

Once the difference between each pixel of the current captured screen frame of video data and each corresponding pixel of the previous captured screen frame of video data is calculated and compared to the tstatic value associated with a current quality level, the video data associated with the current captured screen frame may be filtered by the FPGA 200 in accordance with the current quality level.

As shown in FIG. 3A, the dynamic table 216a also includes a nstatic value, a static_ix value, a ninter value, and an inter_ix value. Each of these values are used by the FPGA 200 to determine which of the quality tables 216 should be accessed to select quality levels and filtering values for video data to be transmitted to the remote computer 138. In an embodiment of the present invention, the nstatic value represents a number of successive static screen frames to be captured by the FPGA 200 before moving from the dynamic quality table 216a to the static quality table 216b. A static screen frame is a screen frame of video data captured by the FPGA 200 that does not include any data changes when compared to a previous captured screen frame of video data. As illustrated in FIG. 3A, at each quality level of the dynamic quality table 216a, the FPGA 200 moves to the static quality table 216b once three successive static screen frames of video data are captured. The static_ix value of the dynamic quality table 216a supplies the FPGA 200 with the index level of the static quality table 216b to be referenced once the FGPA captures a number of consecutive static screen frames equal to the nstatic value of the dynamic quality table. For example, if a current captured screen frame of video data is filtered based on the quality level "Q11" and determined to be the third static screen frame captured, then the FPGA 200 moves to index 2 of the static quality table 216b and uses the quality level and filtering values corresponding to index 2 to filter the next screen frame of video data captured.

The FPGA 200 continues to use the static quality table 216b to determine quality levels at which video data associated with captured screen frames of video data should be transmitted until a screen frame of video data is captured that includes changes in video data when compared to the previous captured screen frame of video data. As shown in FIG. 3B, each index level of the static quality table 216b is associated with a particular number of successive captured static screen frames of video data such that when that number is reached, the quality level of video data transmitted to the remote computer 138 improves until the highest quality level, index 3, is reached at which time the quality level is decreased to index 4 since the video data displayed at the remote computer 138 is already at the highest quality level possible based on the bandwidth of the network 124 and the preferred screen frame rate. In particular, if the FPGA 200 is filtering video data associated with a current captured screen frame at index 2 of the static quality table 216b and determines that the current captured screen frame is the sixth successive static screen frame captured, then the FPGA 200 utilizes the quality level and filtering values associated with index 3 for the next captured screen frame of video data. Furthermore, the FPGA 200 will continue using the values associated with index 3 until three more successive static screen frames of video data are captured at which time the FPGA will begin utilizing the quality level and filtering values associated with index 4 of the static quality table 216b. When changes in video data between successive captured screen frames are determined, the FPGA 200 moves back to the last quality level accessed in the dynamic quality table 216a to filter the next successive screen frame of video data.

In a further embodiment of the present invention, the ninter value of the dynamic table 216a represents a number of successive dynamic screen frames of video data to be captured by the FPGA 200 before moving from the dynamic quality table 216a to the intermediate quality table 216c. A dynamic screen frame is a screen frame of video data captured by the FPGA 200 that includes changes in data when compared to a previous captured screen frame of video data. As illustrated in FIG. 3B, at each quality level of the dynamic quality table 216a, the FPGA 200 moves to the intermediate quality table 216c once sixty successive dynamic screen frames of video data are captured. The inter_ix value of the dynamic quality table 216a supplies the FPGA 200 with the index level of the intermediate quality table 216c to be referenced once the FGPA captures a number of successive dynamic screen frames equal to the ninter value of the dynamic quality table. By using the intermediate quality table 216c, the FPGA 200 is able to transmit a screen frame of video data to the remote computer 138 at a quality level higher than a current dynamic quality level being used but lower than the next higher dynamic quality level. For example, if a current captured screen frame of video data is filtered based the quality level "Q9" and determined to be the sixtieth dynamic screen frame captured, then the FPGA 200 moves to index 2 of the intermediate quality table 216c and uses the quality level and filtering values corresponding to index 2 to filter the next screen frame of video data captured. As shown in FIG. 3C, the quality level and filtering values associated with index 2 of the intermediate quality level 216c cause the captured screen frame of video data to be transmitted at a higher quality than the quality level "Q9" of the dynamic quality table 216a but lower than the next higher quality level "Q10" of the dynamic quality table. Once the captured screen frame of video data is filtered based on index 2 of the intermediate quality table 216c, the FPGA 200 moves back to the dynamic quality table 216a to filter the next successive screen frame of video data captured. It should be understood that the types of quality tables 216 and values associated with the quality tables as described above are disclosed as exemplary embodiments of the present invention and, therefore, should not limit the present invention to the quality tables and values described above.

Once the amount of the video data associated with a current captured screen frame to be transmitted to the remote computer 138 is determined, the FPGA 200 determines whether the amount of video data to be transmitted can be transmitted to the remote computer at the quality level initially associated with the video data to determine the amount of video data to be transmitted to the remote computer. As previously mentioned, the quality level of video data generated by the local computer 102 and transmitted to the remote computer 138 is dictated by the amount of the video data to be transmitted, bandwidth associated with the network 124 or the amount of data that can be transmitted over the network 124 in a fixed amount of time, and a preferred number of screen frames of video data to be received at the remote computer from the local computer in a fixed amount of time. In an embodiment of the present invention, the bandwidth associated with the network 124 and the preferred rate of receiving screen frames of video data at the remote computer 138 are provided by a user of the remote computer. In particular, keyboard and mouse commands corresponding to the preferred bandwidth and screen frame rate may be provided by a user of the remote computer 138 and received at the redirection controller 104 of the local computer 102 via the network 124. The redirection controller 104 stores the bandwidth and the preferred screen frame rate in the storage device 204. According to another embodiment of the present invention, the local computer 102 may auto detect available bandwidth associated with the network 124 and store the detected bandwidth in the storage device 204 of the redirection controller 104.

Using the received bandwidth associated with the network 124 and the preferred screen frame rate stored in the storage device 204, the FPGA 200 calculates an amount of video data capable of being transmitted per screen frame from the local computer 102 to the remote computer 138. In particular, the FPGA 200 divides the received bandwidth associated with the network 124 (bytes/second) by the preferred screen frame rate provided by the user (screen frames/second) to calculate the amount of video data capable of being transmitted per screen frame (bytes/screen frame) from the local computer 102 to the remote computer 138 via the network 124. Thus, the lower the bandwidth associated with the network 124 and the higher the screen frame rate selected by a user of the remote computer 138, the smaller the amount of video data that can be transmitted per screen frame to the remote computer. The calculated amount of video data capable of being transmitted per screen frame to the remote computer 138 may be stored in the storage device 204 of the redirection controller 104.

After determining an amount of video data associated with a current captured screen frame to be transmitted to the remote computer 138 using one of the filtering processes and a quality level as described above, the FPGA 200 may retrieve the calculated amount of video data capable of being transmitted per screen frame from the storage device 204 and compare the two amounts of video data to determine if the amount of video data associated with the current captured screen frame to be transmitted can be transmitted to the remote computer at the quality level used to determine the amount of video data to be transmitted. The FPGA 200 adjusts the quality level associated with the video data to be transmitted to the remote computer 138 until a quality level is selected that causes the amount of the video data associated with the current captured screen frame to be transmitted to be closest to the calculated amount of video data capable of being transmitted without exceeding the amount of video data capable of being transmitted. If the amount of video data to be transmitted to the remote computer 138 is greater than the calculated amount of video data capable of being transmitted to the remote computer, the FPGA 200 decreases the quality level of the video data, which causes a decrease in the amount of video data to be transmitted from the local computer 102 to the remote computer 138. Conversely, if the amount of video data to be transmitted to the remote computer 138 is less than the calculated amount of video data capable of being transmitted to the remote computer, the FPGA 200 may increase the current quality level of the video data.

Figure 4A:
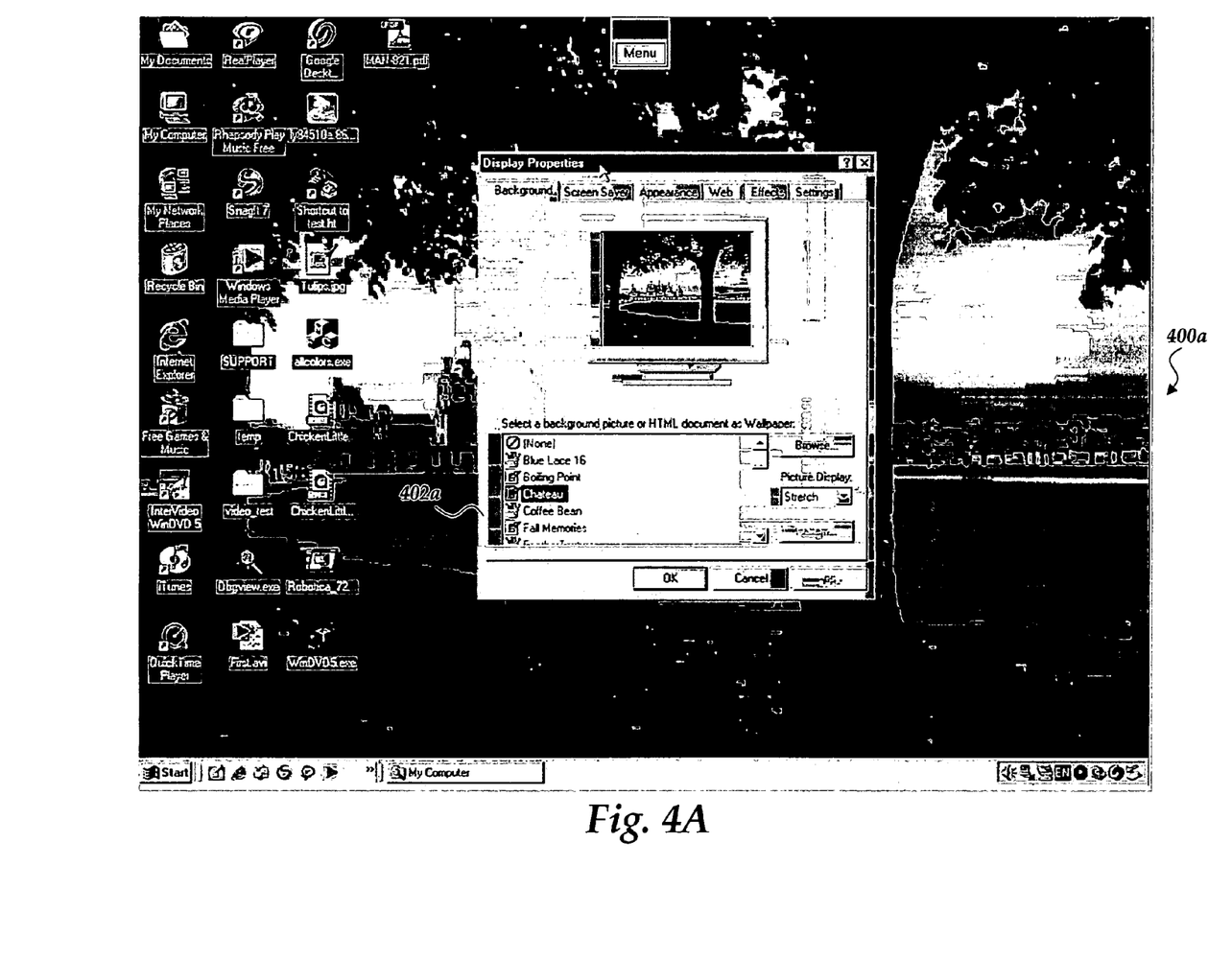
FIGS. 4A-4B illustrate video data generated by a local computer and displayed at a remote computer based on various embodiments of the present invention.
Figure 4B:
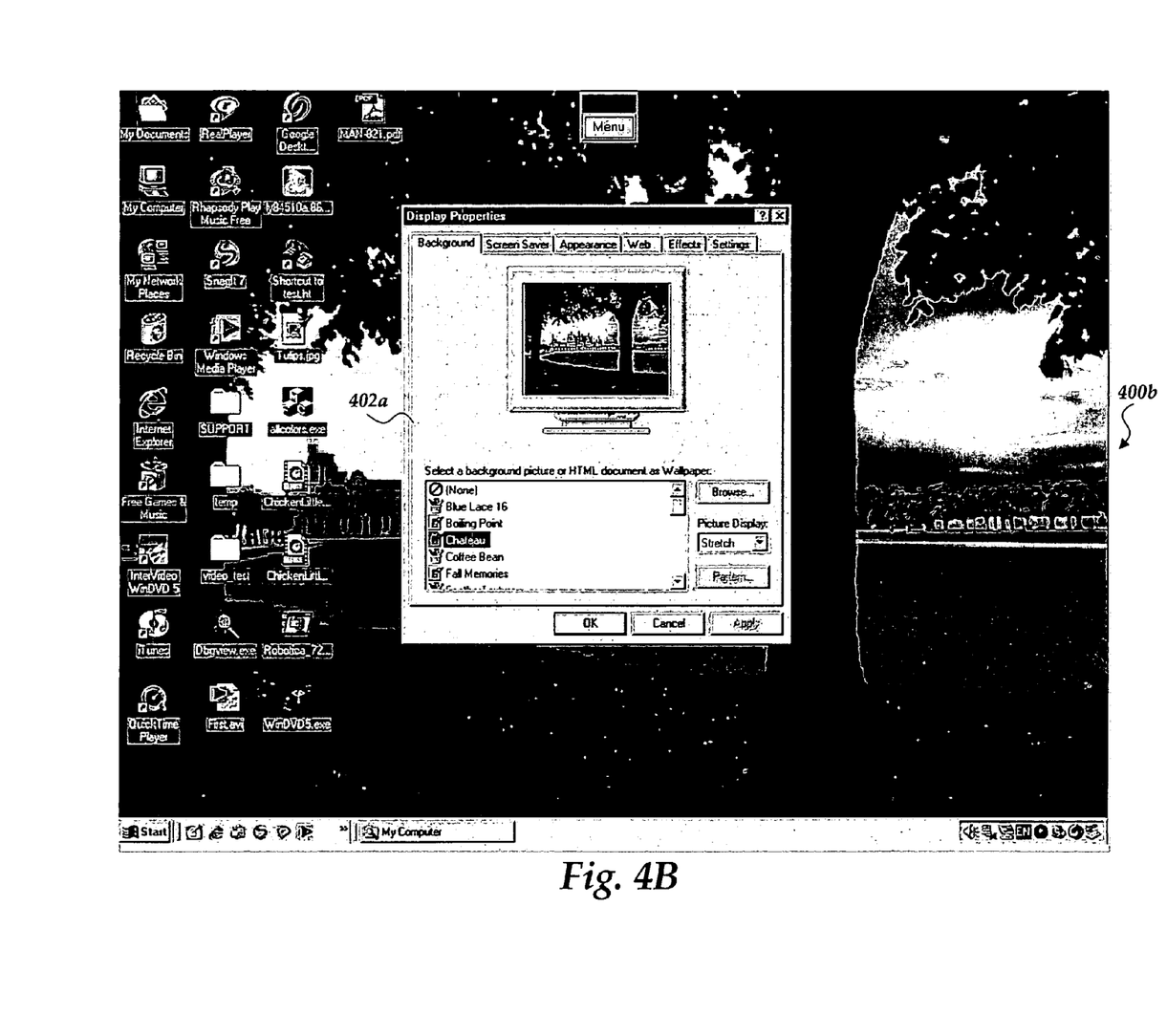

For example, when a user at the remote computer 138 moves a dialogue box generated by the local computer 102 and displayed on the remote computer from a first position to a second position, the amount of video data to be transmitted per screen frame to the remote computer increases because of the increase in data change between successive screen frames of the video data. While the dialogue box is being moved, the FPGA 200 may decrease the quality level of the video data to be transmitted to the remote computer 138 such that larger blocks of pixels of a current captured screen frame of video data are compared with blocks of pixels at the same location of a previous captured screen frame, causing the amount of the video data to be transmitted to the remote computer to be less than or equal to the amount of video data capable of being transmitted to the remote computer based on the available bandwidth of the network 124 and the preferred screen frame rate of receiving screen frames of the video data at the remote computer. Thus, as illustrated in FIG. 4A, elements of a dialogue box 402a displayed on a screen display 400a at the remote computer 138 may appear imprecise and blurry because of the reduced quality level of the transmitted video data associated with the dialogue box. When the user at the remote computer 138 stops moving the dialogue box 402a, the amount of the video data to be transmitted to the remote computer per screen frame decreases because of the decrease in video data changes between successive screen frames of the video data generated by the local computer 102. Thus, the FPGA 200 may increase the quality level of the video data to be transmitted to the remote computer 138 such that smaller blocks of pixels or single pixels of a current captured screen frame of video data are compared with smaller blocks of pixels or single pixels at the same location of a previous captured screen frame. Since the successive screen frames of video data are being compared at a smaller scale, the video data transmitted to the remote computer 138 at the higher quality level causes the elements of the dialogue box 402a displayed on a screen display 400b at the remote computer to appear precise and clear, as illustrated in FIG. 4B.

Even when no video data changes occur between successive screen frames of video data, the FPGA 200 may continue to increase the quality level and transmit an amount of video data to the remote computer 138 because as smaller blocks of pixels are compared between successive captured screen frames of video data, video data changes not previously detected when larger blocks of pixels were compared may be found and transmitted to the remote computer, causing the images displayed at the remote computer to become more precise. When the FPGA 200 first determines that no changes in video data have occurred between a current captured screen frame and a previous captured screen frame, the FPGA may store the quality level associated with the previous captured screen frame, which was associated with the last change in video data between successive screen frames, and then increase the quality level of the video data to be transmitted to the remote computer 138. When the next change in video data between a current captured screen frame and a previous captured screen frame occurs, the FPGA 200 may retrieve the stored quality level and use the stored quality level to determine an amount of video data to be transmitted to the remote computer 138 instead of using the next lower quality level to the current quality level. By using the stored quality level, the FPGA 200 more quickly returns to quality levels that cause amounts of video data associated with changes in data between successive captured screens to be less than or equal to the calculated amount of video data capable of being transmitted to the remote computer.

Figure 5A:
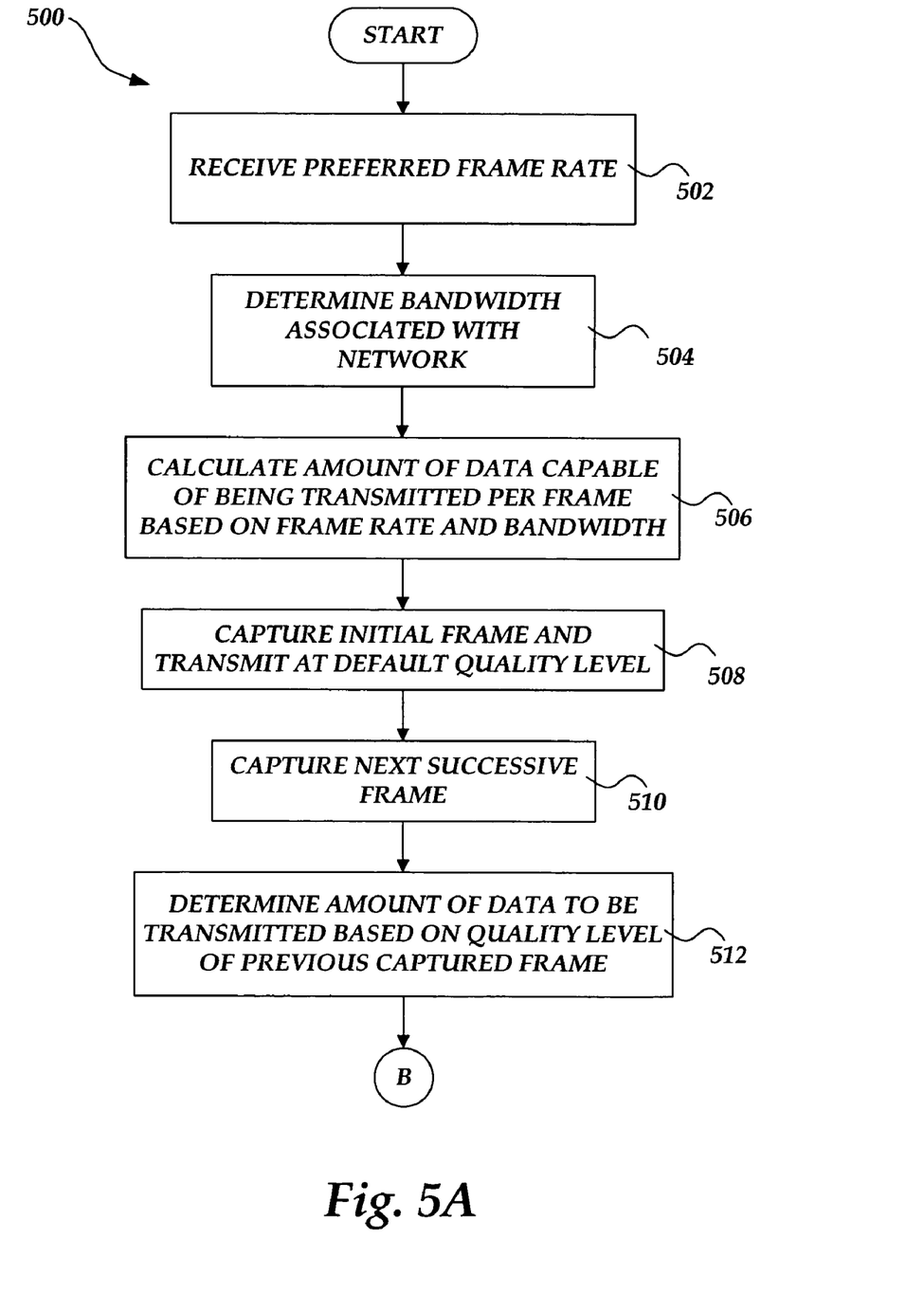
FIGS. 5A-5B are flow diagrams illustrating aspects of a process for adjusting quality level associated with data generated at a local computer and transmitted to a remote computer according to an embodiment of the present invention.
Figure 5B:
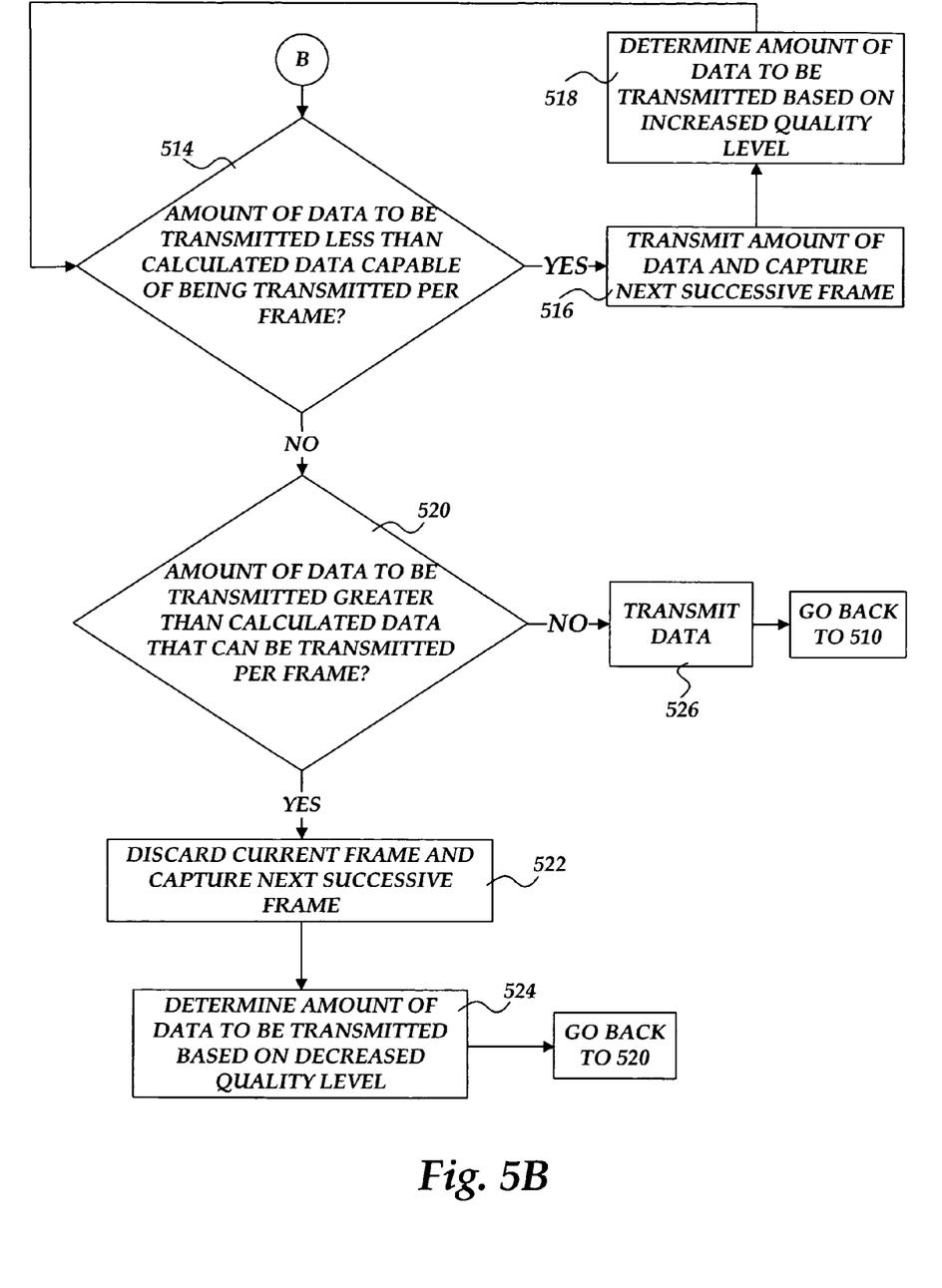

Referring now to FIGS. 5A-5B, additional details regarding the operation of the redirection controller 104 will be described. In particular, FIGS. 5A-5B illustrate a routine 500 performed by the local computer 102 for determining a quality level for video data generated by the local computer to be transmitted to the remote computer 138 through the network 124 such that the amount of the video data to be transmitted does not exceed the amount of the video data capable of being transmitted to the remote computer.

The routine 500 begins at operation 502, where a preferred screen frame rate is received at the local computer 102 from a user of the remote computer 138. The preferred screen frame rate includes a selected number of screen frames of video data to be received at the remote computer 138 from the local computer 102 in a fixed amount of time. As discussed above, keyboard and mouse commands corresponding to the preferred screen frame rate may be provided by a user of the remote computer 138 and received at the redirection controller 104 of the local computer 102 via the network 124. Once received, the redirection controller 104 stores the preferred screen frame rate in the storage device 204.

From operation 502, the routine 500 proceeds to operation 504, where a bandwidth associated with the network 124 is determined. The bandwidth associated with the network includes the amount of data capable of being transmitted over the network in a fixed amount of time. In an embodiment of the present invention, the bandwidth associated with the network 124 may be provided by a user of the remote computer 138. In particular, keyboard and mouse commands corresponding to the preferred bandwidth may be provided by a user of the remote computer 102 and received at the redirection controller 104 of the local computer 102 via the network 124. The redirection controller 104 stores the bandwidth in the storage device 204. According to another embodiment of the present invention, the local computer 102 may auto detect available bandwidth associated with the network 124 and store the detected bandwidth in the storage device 204 of the redirection controller 104. The routine 500 then continues to operation 506.

At operation 506, the redirection controller 104 calculates an amount of video data capable of being transmitted per screen frame from the local computer 102 to the remote computer 138 via the network 124 based on the preferred screen frame rate and the bandwidth associated with the network stored in the storage device 204. In particular, as discussed above, the redirection controller 104 divides the bandwidth associated with the network 124 (bytes/second) by the preferred screen frame rate provided by the user (screen frames/second) to calculate the amount of video data capable of being transmitted per screen frame (bytes/screen frame) from the local computer 102 to the remote computer 138 via the network 124.

From operation 506, the routine 500 continues to operation 508, where an initial screen frame of video data from the graphics adapter 128 of the local computer 102 is captured by the redirection controller 104 and transmitted through the network 124 to the remote computer 138 at a default quality level. In an embodiment of the present invention, the default quality level utilized by the redirection controller 104 to transmit an initial captured screen frame of video data to the remote computer 138 is a mid-quality level such as, for example, quality level "Q8" from the dynamic quality table 216a illustrated in FIG. 3A. It should be appreciated by those skilled in the art that the default quality level for transmitting an initial captured screen frame of video data may be any number of available quality levels.

Once the initial screen frame of video data generated by the local computer 102 is transmitted to the remote computer 138, the routine 500 proceeds from operation 508 to operation 510, where the redirection controller 104 captures the next successive screen frame of video data. The routine 500 then continues to operation 512, where an amount of video data associated with the current captured screen frame of the video data to be transmitted to the remote computer 138 is determined based on the quality level of the previous captured screen frame of the video data. As discussed above, the amount of video data associated with the current captured screen frame of video data to be transmitted to the remote computer 138 is the amount of video data change between the current captured screen frame of video data and the previous captured screen frame of video data. The redirection controller 104 may utilize the XOR filtering process or the threshold filtering process discussed above or any other suitable filtering process known to those skilled in the art to determine the amount of video data change between the current captured screen frame and the previous captured screen frame. The quality level of the previous captured screen frame of video data dictates the size of the blocks of pixels of the current captured screen frame that are compared to the blocks of pixels at the same locations of the previous captured screen frame. The redirection controller 104 may determine the size of the block of pixels of the current captured screen frame to be compared to the same size block of pixels of the previous captured screen frame by accessing the dynamic quality table 216a stored in the storage device 204 and retrieving the cell_x and cell_y values corresponding to the quality level at which video data from the previous captured screen frame was transmitted to the remote computer. Moreover, as discussed above, the redirection controller 104 may also use the other values associated with the quality level of the video data transmitted from the previous captured screen frame to determine when video data changes have actually occurred between the current captured screen frame of video data and the previous captured screen frame of video data and to determine which of the quality tables 216 and corresponding quality level should be used to filter video data associated with the next successive captured screen frame of video data.

From operation 512, the routine 500 proceeds to operation 514, where the redirection controller 104 determines whether the amount of video data associated with the current captured screen frame of video data to be transmitted to the remote computer 138 is less than the calculated amount of video data capable of being transmitted per screen frame to the remote computer. If the amount of video data associated with the current captured screen frame to be transmitted to the remote computer 138 is less than the calculated amount of video data capable of being transmitted, the routine 500 proceeds to operation 516, where the amount of video data associated with the current captured screen frame is transmitted to the remote computer at the quality level associated with the previous captured screen frame of video data and the next successive screen frame of video data is captured. The routine 500 then proceeds to operation 518, where the redirection controller 104 increases the quality level and uses the increased quality level to determine an amount of video data associated with the current captured screen frame of the video data to be transmitted to the remote computer 138. As discussed above, the amount of video data associated with the current captured screen frame of video data to be transmitted to the remote computer 138 is the amount of video data change between the current captured screen frame of video data and the previous captured screen frame of video data. The increased quality level dictates the size of the blocks of pixels of the current captured screen frame that are compared to the blocks of pixels at the same locations of the previous captured screen frame. In an embodiment of the present invention, if the redirection controller 104 receives mouse or keyboard commands from the remote computer 138 while increasing the quality level of video data to be transmitted to the remote computer, the redirection controller may cancel the increase in the quality level and use the lower quality level associated with the previous captured screen frame so that changes between captured screen frames of video data caused by the received mouse or keyboard commands are provided to the remote computer 138 more quickly.

The routine 500 then proceeds back to operation 514, where the redirection controller 104 determines if the amount of video data associated with the current captured screen frame of video data to be transmitted to the remote computer 138 is less than the calculated amount of video data capable of being transmitted to the remote computer. If so, then the routine proceeds to operation 516 where the amount of video data associated with the current captured screen frame is transmitted to the remote computer 138 at the increased quality level and the next successive screen frame of video data is captured. The routine 500 then proceeds to operation 518, where the redirection controller 104 increases the quality level again and uses the increased quality level to determine an amount of video data associated with the current captured screen frame of the video data to be transmitted to the remote computer 138. The routine 500 then proceeds back to operation 514, where the redirection controller 104 determines if the amount of video data associated with the current captured screen frame of video data to be transmitted to the remote computer 138 is less than the calculated amount of video data capable of being transmitted to the remote computer. The redirection controller 104 continues to increase the quality level associated with an amount of video data to be transmitted to the remote computer 138 and transmit the amount of video data at the increased quality level to the remote computer until an amount of video data associated with a current captured screen frame to be transmitted to the remote computer is not less than the amount of video data capable of being transmitted.

If, at operation 514, the redirection controller 104 determines that the amount of data associated with a current captured screen frame to be transmitted to the remote computer 138 is not less than the calculated amount of video data capable of being transmitted to the remote computer, the routine 500 proceeds to operation 520, where a determination is made whether the amount of video data associated with the current captured screen frame to be transmitted is greater than the calculated amount of video data capable of being transmitted. If the amount of video data associated with the current captured screen frame to be transmitted to the remote computer 138 is greater than the calculated amount of video data capable of being transmitted, then the routine 500 proceeds to operation 522, where the current captured screen frame of video data is discarded, and the next successive screen frame of video data is captured. The routine 500 then proceeds to operation 524, where the redirection controller 104 decreases the quality level and uses the decreased quality level to determine an amount of video data associated with the current captured screen frame of the video data to be transmitted to the remote computer 138. As discussed above, the amount of video data associated with the current captured screen frame of video data to be transmitted to the remote computer 138 is the amount of video data change between the current captured screen frame of video data and the previous captured screen frame of video data, which in this case is the screen frame of video data immediately preceding the discarded screen frame of video data. The decreased quality level dictates the size of the blocks of pixels of the current captured screen frame that are compared to the blocks of pixels at the same locations of the previous captured screen frame.

The routine 500 then proceeds back to operation 520, where the redirection controller 104 determines if the amount of video data associated with the current captured screen frame of video data to be transmitted to the remote computer 138 is greater than the calculated amount of video data capable of being transmitted to the remote computer. If so, then the redirection controller 104 continues to discard the current captured screen frame of video data, capture the next successive screen frame, and decrease the quality level associated with the amount of video data to be transmitted to the remote computer until the amount of video data associated with the current captured screen frame to be transmitted is no longer greater than the calculated amount of video data capable of being transmitted to the remote computer.

If, at operation 520, the redirection controller 104 determines that the amount of video data associated with the current captured screen frame of video data to be transmitted to the remote computer 138 is not greater than the calculated amount of video data capable of being transmitted to the remote computer, then the routine 500 proceeds to operation 526, where the redirection controller 104 transmits the amount of video data associated with the current captured screen frame to the remote computer 138 at the quality level used to determine the amount of video data associated with the current captured screen frame to be transmitted. From operation 526, the routine 500 proceeds back to operation 510, where the next successive screen frame of video data is captured.

It will be appreciated that embodiments of the present invention provide methods, systems, apparatus, and computer-readable medium for adjusting quality level associated with video data generated by a local computer to be transmitted to a remote computer through a network such that the amount of the video data to be transmitted does not exceed the amount of the video data capable of being transmitted. Although the invention has been described in language specific to computer structural features, methodological acts, and by computer readable media, it is to be understood that the invention defined in the appended claims is not necessarily limited to the specific structures, acts, or media described. Therefore, the specific structural features, acts, and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of transmitting data between a local computer and a remote computer, comprising:
    determining an amount of data capable of being transmitted per screen frame from the local computer to the remote computer;
    capturing a first screen frame of data from the local computer;
    determining a first quality level of the first screen frame of data;
    determining a first cell value and a second cell value, wherein each of the first cell value and the second cell value correspond to the first quality level of the first screen frame of data;
    capturing a second screen frame of data from the local computer;

determining a size of blocks of data of the second screen frame of data for comparing with the blocks of data at the same locations of the first screen frame of data, wherein the size of the blocks of data is based on the first cell value and the second cell value;

comparing the second screen frame to the first screen frame based on the first quality level associated with the first screen frame of data to determine a first amount of change in data between the second screen frame and the first screen frame, the first amount of change in data between the second screen frame and the first screen frame representing an amount of first data to be transmitted at the first quality level from the local computer to the remote computer, wherein the first amount of change in data between the second screen frame and the first screen frame is determined by comparing the blocks of data with of the second screen frame of data with the blocks of data at the same locations of the first screen frame of data, and wherein each of the blocks of data compared is the same determined size;

determining whether the amount of the first data to be transmitted to the remote computer at the first quality level is greater than the amount of data capable of being transmitted per screen frame from the local computer to the remote computer;

when the amount of the first data to be transmitted at the first quality level is greater than the amount of data capable of being transmitted per screen frame, then:

discarding the second screen frame of data, capturing a third screen frame of data, comparing the third screen frame to the first screen frame based on a second quality level to determine an amount of change in data between the third screen frame and the first screen frame, the amount of change in data between the third screen frame and the first screen frame representing an amount of second data to be transmitted at the second quality level from the local computer to the remote computer, the second quality level lower than the first quality level, determining whether the amount of the second data to be transmitted to the remote computer at the second quality level is greater than the amount of data capable of being transmitted per screen frame from the local computer to the remote computer, and when the amount of the second data to be transmitted to the remote computer at the second quality level is less than or equal to the amount of data capable of being transmitted per screen frame, then transmitting the amount of the second data to the remote computer at the second quality level; and when the amount of the first data indicates no data change between the second screen frame of data and the first screen frame of data, then:

storing the first quality level, and comparing the second screen frame to the first screen frame based on a third quality level that is higher than the first quality level to determine a second amount of change in data between the second screen frame and the first screen frame.

2. The method of claim 1, further comprising:

if the amount of the second data to be transmitted to the remote computer at the second quality level is greater than the amount of data capable of being transmitted per frame, then:

discarding the third screen frame of data;

capturing a fourth screen frame of data;

comparing the fourth screen frame to the first screen frame based on a fourth quality level to determine an amount of change in data between the fourth screen frame and the first screen frame, the amount of change in data between the fourth screen frame and the first screen frame representing an amount of third data to be transmitted from the local computer to the remote computer at the fourth quality level, the fourth quality level lower than the second quality level;

determining whether the amount of the third data to be transmitted to the remote computer at the fourth quality level is greater than the amount of data capable of being transmitted per screen frame from the local computer to the remote computer; and if the amount of the third data associated with the fourth quality level to be transmitted to the remote computer is less than or equal to the amount of data capable of being transmitted per screen frame, then transmitting the amount of the third data to the remote computer at the fourth quality level.

3. The method of claim 1, further comprising:

if the amount of the first data to be transmitted at the first quality level is less than the amount of data capable of being transmitted per screen frame to the remote computer, then:

transmitting the first data at the first quality level;

capturing the third screen frame of data from the local computer;

comparing the third screen frame to the second screen frame based on the third quality level that is higher than the first quality level to determine an amount of change in data between the third screen frame and the second screen frame, the amount of change in data between the third screen frame and the second screen frame representing an amount of fourth data to be transmitted at the third quality level from the local computer to the remote computer, determining whether the amount of the fourth data to be transmitted to the remote computer at the third quality level is less than the amount of data capable of being transmitted per screen frame from the local computer to the remote computer, and if the amount of the fourth data to be transmitted to the remote computer at the third quality level is less than the amount of data capable of being transmitted per screen frame, then transmitting the amount of the fourth data to the remote computer at the third quality level.

* * * * *